US006873628B1

(12) United States Patent
Tang (10) Patent No.: US 6,873,628 B1
(45) Date of Patent: Mar. 29, 2005

(54) ASYNCHRONOUS DIGITAL SUBSCRIBER LINE (ADSL) RESOURCE PLANNING

(75) Inventor: Harry Tang, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 638 days.

(21) Appl. No.: 09/749,193

(22) Filed: Dec. 27, 2000

(51) Int. Cl.$^7$ .......................... H04L 12/28; H04L 12/56
(52) U.S. Cl. ...................... 370/480; 370/352; 370/354; 370/355; 370/395.1; 709/203
(58) Field of Search ................................. 370/480, 352, 370/397, 422, 463, 468, 474, 395.51, 395.52, 389, 356, 395.1, 421, 486, 465, 469, 470, 354; 710/105, 10; 725/81; 379/93.01; 709/203; 359/117

(56) References Cited

U.S. PATENT DOCUMENTS

| | | | | |
|---|---|---|---|---|
| 5,613,190 A | * | 3/1997 | Hylton ......................... | 725/81 |
| 5,627,836 A | * | 5/1997 | Conoscenti et al. ......... | 370/397 |
| 6,028,867 A | * | 2/2000 | Rawson et al. .............. | 370/463 |
| 6,160,810 A | * | 12/2000 | Brodigan ................ | 370/395.52 |
| 6,198,745 B1 | * | 3/2001 | Brodigan ................ | 370/395.51 |
| 6,404,861 B1 | * | 6/2002 | Cohen et al. ............. | 379/93.01 |
| 6,477,595 B1 | * | 11/2002 | Cohen et al. ................ | 710/105 |
| 6,636,505 B1 | * | 10/2003 | Wang et al. ................. | 370/352 |

* cited by examiner

Primary Examiner—Phirin Sam
Assistant Examiner—Anthony Ton
(74) Attorney, Agent, or Firm—Woodcock Washburn LLP (57) ABSTRACT

A system and methods to optimize the resource planning of ADSL services is provided. In an illustrative implementation, a network management system (NMS) communicates with an ADSL network to provision resources for participating users. The provisioning process yields a permanent virtual circuit (PVC). Included in the provisioning process is the creation and management of configuration variables, such as, the virtual path identifier (VPI) and the virtual circuit identifier (VCI). The VPI/VCI combination uniquely identifies each PVC. If the provisioning process is aborted or fails, it may be reanimated by the NMS using the VPI/VCI combination. In this implementation, the VPI may be set to a constant value and the VCI value calculated using ADSL configuration values (e.g. the physical connection position on a first, second, third, etc. ADSL network component.) The deterministic nature of the VPI and VCI configuration variables assist the NMS to track and optimize available resources.

12 Claims, 6 Drawing Sheets

ASYNCHRONOUS DIGITAL SUBSCRIBER LINE (ADSL) RESOURCE PLANNING

FIELD OF THE INVENTION

The present invention generally relates to the provisioning of resources for a subscriber on an asynchronous digital subscriber line (ADSL) network. Particularly, the present invention relates to optimizing resource provisioning and, more particularly, to providing a system and method to efficiently and reliably manage and optimize resources needed to establish ADSL permanent virtual circuits (PVCs) between subscribers and Internet Service Providers (ISP)/Network Service Providers (NSP).

BACKGROUND OF THE INVENTION

Computing has become an integral component in our daily lives—so much so, that it is nearly impossible to imagine not interfacing with some form of computing device in a given day. The proliferation of computing has helped spawn the development of extremely effective and pervasive communication technologies, such as local area networks, wide area networks, intranets, and the Internet. These communication technologies, much like computing, have become ingrained in our lives, as new industries and markets have sprung into existence to provide services and products using these communication technologies. As more consumers incorporated these communication technologies into their personal or business practices, more service providers have been created to provide the needed communications support. Today, a significant amount of information is being deployed through these communication technologies. As such, connectivity has become paramount to consumers. Coupled to connectivity, the speed at which the information may be accessed is an important factor that is considered by consumers when choosing a communications service provider.

Service providers addressed the need for reliable and fast connectivity by developing new protocols that transfer data quickly and efficiently over existing public communication networks. For example, asynchronous transfer mode (ATM) and transmission control protocol/internet protocol (TCP/IP) are two protocols that realize the transfer of significant amounts of data. Utilizing these protocols, new services, such as digital subscriber line (DSL) and asynchronous digital subscriber line (ADSL) were developed that offered participating users fast connectivity rates and integrated services. DSL and ADSL service providers exploit traditional public networks (e.g. telephone networks) by creating three distinct channels over a single twisted pair wire connecting a subscriber to the public network. These channels include a transmitting channel to transmit non-voice data, a receiving channel to receive non-voice data, and a voice channel to transmit and receive voice data. By using existing public networks, participating users are offered desired communications services without the need for new communications networks and costly equipment.

Although averting costs and the expenditure of resources by using existing public networks, DSL and ADSL service providers face many challenges in implementing this service on existing public networks. Among these challenges is the provisioning of ADSL network resources for each subscriber. Provisioning is a process that yields an end-to-end permanent virtual circuit (PVC) between the subscriber and the Internet Service Provider (ISP)/Network Service Provider (NSP). Included in the provisioning process is the configuration of various ADSL network hardware to enable the ADSL network to recognize and service participating users. The ADSL network hardware employs a number of configuration variables to establish a PVC. These configuration variables include the Virtual Path Identifier (VPI) and the Virtual Circuit Identifier (VCI). The VPI and VCI variables are integers, that when used in combination provide unique identifiers for each PVC and, correspondingly, for each subscriber. Generally, the assignment of values for the VPI and VCI variables is performed randomly by the provisioning process (e.g. provisioning software). As such, it is very difficult to arbitrarily determine any VCI value or any VPI value once assigned.

Even with the most advanced provisioning procedures, there exist great inefficiencies. For example, the random generation and assignment of ADSL network configuration variables causes several problems. In the case of a "hung" PVC (i.e. the situation where the provisioning system fails during provisioning or, alternatively, where the provisioning system cancels the provisioning of resources in midstream), already assigned VPI values and VCI values are "locked-out" until they are reset manually. Such scenario results in less than optimal use of available provisioning resources. Alternatively, where the provisioning system cancels the provisioning for a given subscriber in midstream and decides to reinstate the provisioning process for that same subscriber (i.e. the situation where a subscriber decides to order ADSL services but changes his/her mind, and then subsequently re-subscribes to ADSL services), the ADSL network operator is left to manually search the logs of the provisioning system to detemine which VCI and VPI values were originally assigned to the subscriber. Such process is extremely inefficient and draws upon valuable resources that could otherwise be better utilized.

From the foregoing it is appreciated that there exists a need for systems and methods that provide deterministic configuration variables to better manage and optimize resources of hung provisioning processes. Such a system and method has not been realized in the prior art.

SUMMARY OF THE INVENTION

The present invention provides a system and method to optimize ADSL network resources when provisioning resources on an ADSL network. As part of the provisioning process, configuration variables are set to create a permanent virtual circuit (PVC). The PVC creates an end-to-end connection between participating users and cooperating Internet Service Providers (ISPs) and Network Service Providers (NSPs). The present invention offers systems and methods that provide deterministic configuration variables such that the value of a configuration variable can be easily calculated.

In an illustrative implementation, the provisioning of resources on an ADSL network is performed by a network management system (NMS). The network management system comprises a computing application which is in communication with the various components of the ADSL network to create, configure, and manage PVCs for participating users. As part of establishing a PVC, the virtual path identifier (VPI) and virtual circuit identifier (VCI) are assigned values that provide a unique VPI/VCI combination which identifies each established PVC. In this implementation, the VPI value may be set by the NMS to a constant value (e.g. 0–15) for a group of feasible VCI values and then incremented when the feasible VCI values have been exhausted. That is, the VPI may be set to a constant value of 2 for the feasible VCI values, VCI=33 to 1023) and be incremented by one (e.g. VPI=3) when all feasible VCI values have been exhausted. Further, the VCI values may be calculated using a number of other PVC configuration values including, the subscriber connection position on components of the ADSL network (e.g. the connection position on the remote access multiplexer (RAM) that physically connects the subscriber to the ADSL network, or alternatively, the connection position on the central office digital subscriber line access multiplexer (CO DSLAM) which connects the RAM to an asynchronous transfer mode (ATM) subnet). The deterministic nature of the VCI variable assists in correcting "hung" provisioning of resource, that is, provisioning processes that are aborted or have failed. In knowing the VPI value and calculating the VCI value, the NMS is better positioned to restart a "hung" provisioning process, i.e. complete a partial PVC. As such, ADSL available network resources are optimized.

Other aspects of the present invention are described below.

BRIEF DESCRIPTION OF THE DRAWINGS

The foregoing summary, as well as the following detailed description, of ADSL network resource planning systems and methods in accordance with the present invention are further described with reference to the accompanying drawings. For the purpose of illustrating the invention, like references numerals represent similar parts throughout the several views of the drawings, it being understood, however, that the invention is not limited to the specific methods and instrumentalities disclosed. In the drawings.

DETAILED DESCRIPTION OF PREFERRED EMBODIMENTS

Overview

Asynchronous Digital Subscriber Line (ADSL) converts existing twisted-pair telephone lines into access paths for multimedia and high-speed data communications. With ADSL, the throughput of data varies depending on whether the subscriber is receiving or transmitting data from or to a cooperating network service provider (NSP). That is, in conventional ADSL systems, the subscriber can receive up to six megabits per second, and as much as 832 kilobits per second or more in both directions. Such rates expand existing access capacity by a factor of 50 or more without requiring new cabling. ADSL expands existing public information networks from one limited to voice, text and low resolution graphics to a powerful, ubiquitous system capable of supporting various forms of multimedia (e.g. streaming audio and video).

Generally, an ADSL circuit connects an ADSL modem on each end of a twisted-telephone line, creating three information channels—a high speed downstream channel, a medium speed duplex channel (depending on the implementation of the ADSL architecture), and a POTS (Plain Old Telephone Service) or an ISDN channel. The POTS/ISDN channel is split off from the digital modem by filters, thus guaranteeing uninterrupted POTS/ISDN, even if ADSL fails. The high speed channel ranges from 1.5 to 6.1 megabits per second, while duplex rates range from 16 to 832 kilobits per second. Each channel can be submultiplexed to form multiple, lower rate channels, depending on the system.

Given that the ADSL technology exploits existing public information networks, the demand for ADSL service is great and it is important to be able to efficiently and reliably provide ADSL to interested subscribers. Realizing that customer satisfaction is tantamount to success, network providers have been driven to develop new processes, hardware, and software to better enhance a potential subscriber's experience when subscribing to the ADSL service. Furthermore, network providers have developed and are developing innovations which facilitate the internal provisioning of ADSL services to potential subscribers. Network providers are striving to reach a point where configuring and using ADSL services is as easy for a user as using today's analog dial-up technologies—if not easier. As such, ADSL service providers have developed automated processes that assist the subscriber in implementing and configuring ADSL equipment to realize ADSL services.

Provisioning of ADSL services for a subscriber entails several steps including the configuration of various ADSL network hardware such that the ADSL network recognizes and services valid subscribers. The ADSL network cooperates with participating ISPs and NSPs over an Asynchronous Transfer Mode (ATM) subnet. As such, certain ATM based configuration variables must be configured during the ADSL services provisioning process. The provisioning of ADSL services yields an end-to-end permanent virtual circuit (PVC) between the subscriber (i.e. subscriber's computing device) and the Internet Service Provider (ISPs)/Network Service Provider (NSPs). Such a process requires that the ADSL network and the subscriber's equipment be provisioned in concert. Resources (e.g. ADSL network hardware and software) in the carrier's core ATM network connect the user's termination on the digital subscriber line access multiplexers (DSLAMs) to particular service providers. Regardless of whether these resources are permanently configured or are set up on a per-session session basis, each user's service must be configured to associate a given user with the service providers that the user is authorized to access.

A permanent virtual circuit (PVC) is a means by which a user is associated with the correct service provider(s). The PVC comprises a plurality of configuration variables that are configured for each participating subscriber. These variables include the virtual path identifier (VPI) and the Virtual Circuit Identifier (VCI). The VPI is a number between 0–9 that is included in the communication protocol header information and indicates the connectivity path of the subscriber. Likewise, the VCI is a number between 0–1023 that is included in ADSL communication protocol header information and indicates which channel on the ADSL hardware the PVC maintains its connection. The VPI and VCI may be used in combination to uniquely identify each subscriber of the ADSL network. During provisioning, a subscriber is assigned a VPI and VCI combination which is stored as an entry in a translation table used to associate the VPI/VCI combination to a particular PVC.

As ATM is a connection-oriented transfer mode, the virtual connection between source and destination has to be established before sending packets that carry user data. All packets of an established connection follow the same path within the network. As part of the VPC configuration each network switch generates an entry into the VPI/VCI translation table.

This enables the switch to move an incoming packet from its VPI/VCI to corresponding outgoing VPI/VCI. In operation, when a packet is sent across the network, the VPI/VCI of the originating party is included in the header of the packet. As such, this kind of routing requires a relatively small header: only a locally valid address (i.e. VPI/VCI) has to be carried in the packet.

The VPI/VCI designations are a key component of the provisioning process, in that they identify the virtual connection to the subscriber's line. These configuration values are provided and stored by the ADSL network management systems. Traditionally, the VPI/VCI configuration values are assigned non-deterministically—that is, they are assigned independently of the physical connection to the subscriber that the VPI/VCI values represent. Typically, the systems controlling the ADSL network will assign a random VPI value (from the available range of VPI values) and a random VCI value (from the available range of VCI values). This lends to a difficult re-animation process for failed or aborted provisioning procedures. Specifically, since these configuration variables are non-deterministic, the ADSL network operator is left to manually trace through configuration logs to determine the VPI/VCI values for the given failed or aborted provisioning procedure. This is a costly endeavor requiring the expenditure of time and labor. A more beneficial resource planning system would provide deterministic configuration variables that may be automatically calculated by the network management system that controls the allocation of such resources.

The present invention seeks to ameliorate the shortcomings of existing ADSL resource provisioning systems and methods. In an illustrative implementation, the systems and methods of the present invention may be employed as part of an ADSL operations and management system. An exemplary ADSL operations and management system comprises a Look Qualification System (LQS), a Service Order Entry System (SOES), a Network Management System (NMS) and an Element Management System (EMS). The LQS is used to determine if the ADSL network can deliver ADSL services to the participating user (e.g. interested subscriber). If qualified, the SOES procures and stores service information for the participating user. A portion of the collected service information is passed to the NMS to begin the provisioning of resources for the participating subscriber. The NMS uses service information to communicate with the ADSL network through the EMS. The EMS communicates with the ADSL network components through common communication protocols to set configuration variables and establish PVCs as per NMS instructions.

In operation, the network management system communicates with ADSL network components to provision resources such to connect an interested subscriber participating user) seeking ADSL services to an ADSL network providing such services. The process begins by physically connecting the subscriber to a remote accessing multiplexer (RAM) (The RAM may be housed and maintained at an ADSL network node local to the participating user). The NMS provides the RAM instructions for configuration of the first leg of the ADSL PVC. In addition, the NMS tracks and stores the configuration information for this first leg. Included in the configuration process of the first leg is the assignment of configuration variables for subscriber. For example, the PORTID configuration variable may be set. The PORTID configuration variable communicates to the NMS, the rack, shelf, card-slot, and port values that the participating subscriber has been given on the accepting RAM.

The NMS communicates with the RAM to calculate and assign the VPI and VCI values to create the VPI/VCI unique combination for the PVC being created. The NMS employs various algorithms to calculate these values. Moreover, if needed (e.g. in the case of hung provisioning processes), these algorithms may be used by the NMS to re-calculate the VPI and VCI values. Further, the NMS communicates with the central office digital subscriber line access multiplexer (CO DSLAM) to set and ascertain additional configuration variables, such as, the ADSL port position on the CO DSLAM (Dpos). Lastly, the NMS communicates with the ATM subnet to which the CO DSLAM is connected to ascertain the ATM network port-id. Using all of these configuration variables, the NMS can provision these ADSL network components (i.e. resources on these ADSL network components) to create PVCs.

As will be described below with respect to FIGS. 1–4, the present invention is directed to systems and methods to optimize resource planning for ADSL services. In accordance with an illustrative implementation thereof, the present invention comprises a system and method to provide ADSL network operators with an enhanced network management system application that will employ deterministic configuration variables that drastically reduce the amount of resources required to re-animate the failed or aborted provisioning resources for ADSL services.

In one embodiment, described more fully hereinafter, the system and method of the present invention may be implemented as part of a network management system of an ADSL network that cooperates with ADSL network components to provision resources for ADSL services. Although the depicted embodiment contemplates a network management system application employing specific algorithms to produce deterministic configuration variables, those skilled in the art will appreciate that the inventive concepts described herein extend to various computing application processes that produce deterministic variables that may be used in the configuration of ADSL services on an ADSL network.

Illustrative ADSL Network Operations and Management Systems

Figure 1:
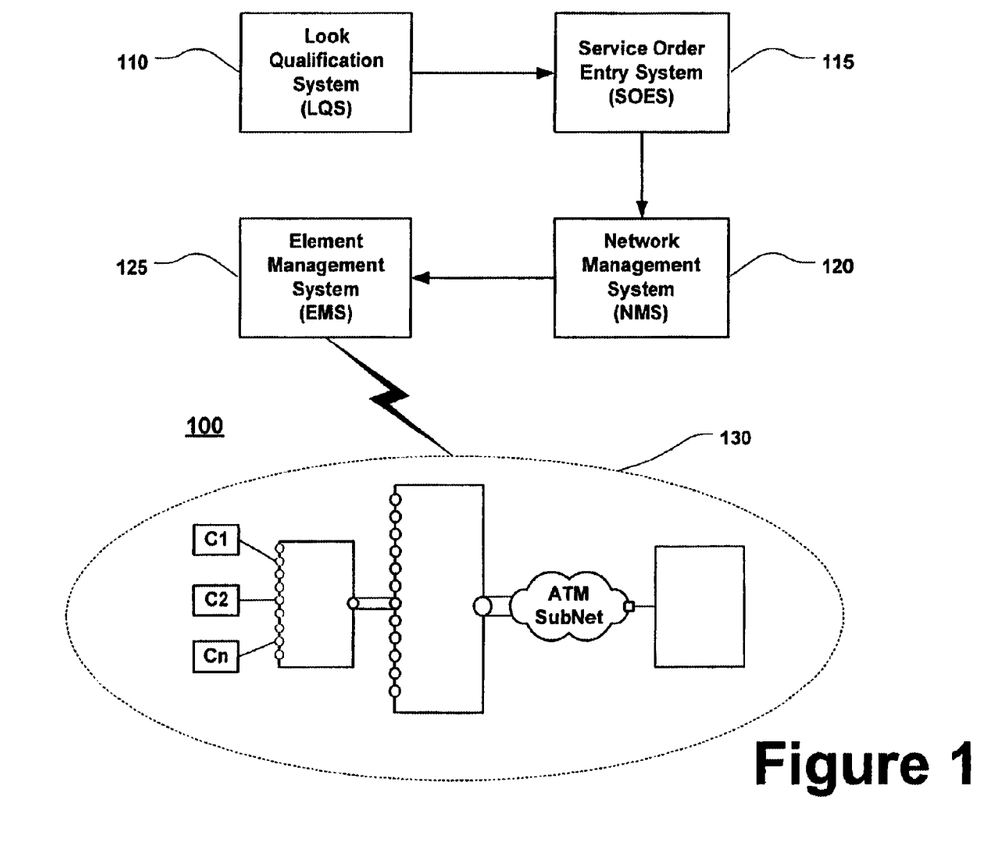
FIG. 1 is a block diagram of an exemplary ADSL network operations and management system, in which aspects of the invention may be implemented.

FIG. 1 shows a block diagram of an illustrative ADSL network operations and management system 100. ADSL network operations and management system 100 comprises Look Qualification System (LQS) 110, Service Order Entry System (SOES) 115, Network Management System (NMS) 120, and Element Management System (EMS) 125. As shown, LQS 110 cooperates with SOES 115. In turn, SOES 115 cooperates with NMS 120, and NMS 120 cooperates with EMS 125. EMS 125 cooperates with ADSL Network 130 to communicate information from LQS 110, SOBS 115, and NMS 120. In operation, LQS 110 checks the feasibility (i.e. qualification) of interested subscribers' network connection and passes this information to SOES 115. For example, LQS 110 may verify that the location of the interested subscriber is within the geographic scope for the offered ADSL services. Upon qualification, SOBS 115 procures service information about interested subscribers. The service information is passed to NMS 120 to begin the provisioning of resources for the interested subscriber. NMS 120 communicates with ADSL network 130 through EMS 125 to communicate instructions for the configuration of PVCs that establish an end-to-end connection between the subscriber and ISPs/NSPs. NMS 120 creates, tracks, stores, and manages the PVCs for ADSL subscribers. In this capacity, NMS 120 can implement changes to PVC configuration.

Illustrative ADSL Network

Figure 2:
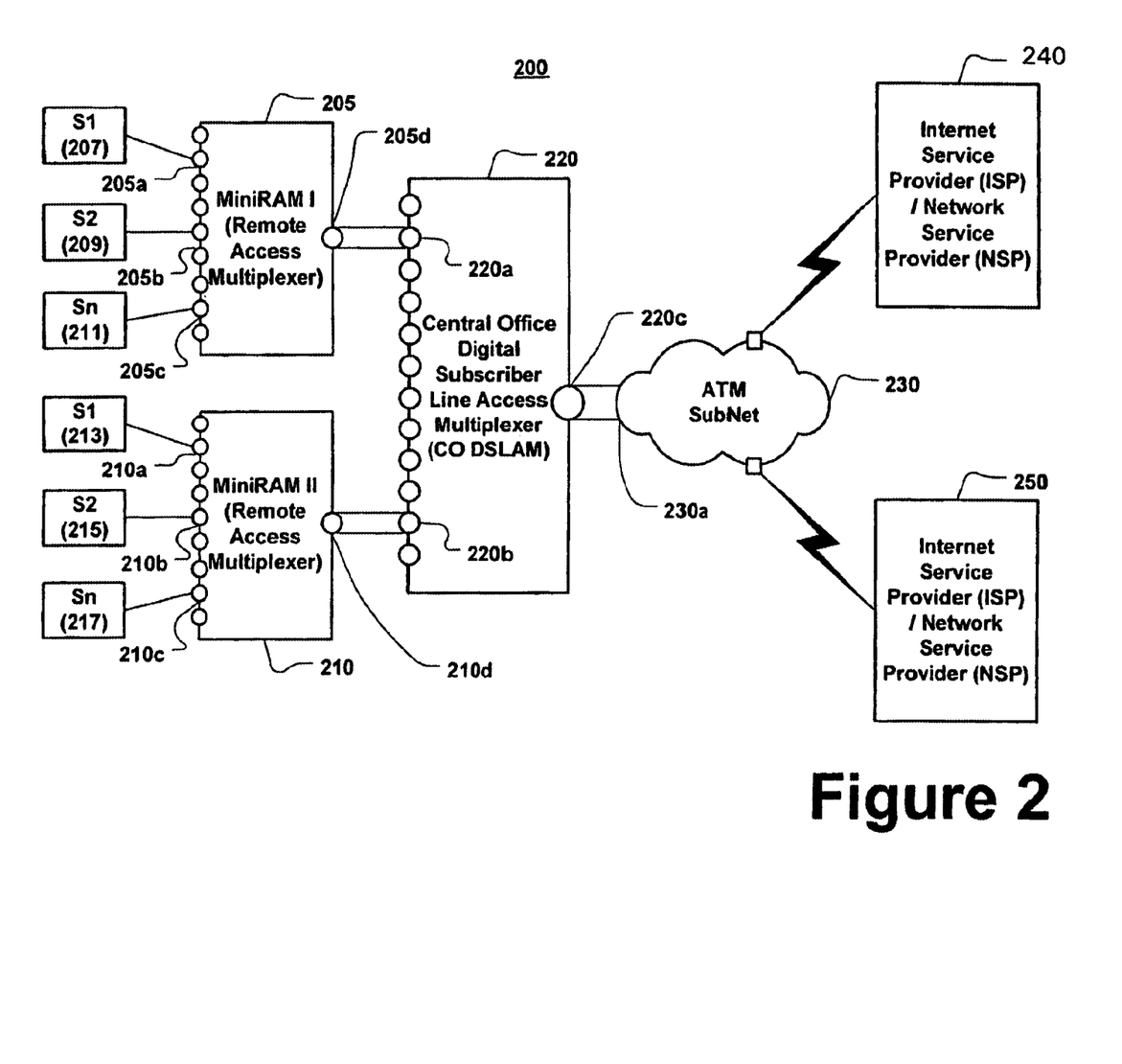
FIG. 2 is a block diagram of an exemplary ADSL network in accordance with the present invention.

FIG. 2 shows a block diagram of illustrative ADSL network 200. ADSL network 200 comprises a plurality of subscribers (207, 209, 211, 213, 215, 217) electronically coupled to a plurality of remote access multiplexers (RAMs) (205, 210) using ports 205a, 205b, 205c, 210a, 210b, and 210c, of RAMs 205 and 210, respectively. Further, ADSL network 200 comprises a central office digital subscriber line access multiplexer (CO DSLAM 220) that accepts RAM outputs 205d and 210d at its input 220a and 220b, respectively. CO DSLAM 220 is coupled at its output 220c to an asynchronous transfer mode (ATM) subnet 230 at input 230a of ATM sub-net. Further, the ATM sub-net 230 is coupled to Internet Service Providers (ISPs)/Network Service Providers (NSPs) (240 and 250). As shown, a plurality of subscribers are connected to RAMs 205 and 210. RAMs 205 and 210 have a plurality of ports to accept ADSL data from subscribers. It should be appreciated that although RAMs 205 and 210 are shown as accepting three subscribers, RAMs 205 and 210 are typically capable of accepting more than three subscribers. RAMs 205 and 210 act to route data to and from the plurality of subscribers to CO DSLAM 220 which in turn route data to ATM subnet 230 that communicates the subscriber data to ISPs/NSPs 240 and 250.

In order for these ADSL network components to communicate data to and from subscribers, these ADSL network components require configuration. The configuration of ADSL network components allow ADSL network components to properly route the data to and from the appropriate subscribers to and from cooperating ISPs/NSPs. That is, as a plurality of subscribers simultaneously provide and request data from cooperating ISPs/NSPs, streams of data pass through these ADSL network components. These ADSL network components require configuration to identify which subscriber or ISP/NSP particular data packets are to be routed to. Accordingly, permanent virtual circuits (PVCs) are created for each subscriber along the ADSL network components. The PVCs are utilized to properly route the data travelling over the ADSL network between subscribers and cooperating ISPs/NSPs.

Provisioning of ADSL Resources (Creation of Permanent Virtual Circuits)

In operation, the NMS (of FIG. 1) (not shown), cooperates with SOES (not shown) and EMS (not shown) to provision resources for subscribers on the ADSL network to create permanent virtual circuits (PVC) between subscribers and cooperating ISPs/NSPs. A PVC allows data to be correctly routed between subscribers and ISPs/NSPs over the ADSL network. The proper communication between ADSL network components is ensured through the creation and assignment of configuration values among the ADSL network components for each subscriber. For example, exemplary ADSL network 200 comprises a RAM, a CO DSLAM, and ATM sub-net. The RAM must be able to communicate data packets received from subscribers to the CO DSLAM in such a manner that the CO DSLAM can route those packets correctly. Similarly, the CO DSLAM must communicate the received packets in such a manner that the ATM sub-net can route those packets to the appropriate ISPs/NSPs I.e., if subscriber S1 (reference numeral 207) uses ISP/NSP 240, packets originating from subscriber S1 must contain sufficient identifying information that they can be routed to ISP/NSP 240 rather than ISP/NSP 250. As such, the NMS knowing the configuration schemes of these ADSL network components assigns and tracks configuration variables on these ADSL network components such that data can be properly routed. Each of the ADSL network components keeps track of the set configuration variables such that received data can be properly processed and communicated to other cooperating ADSL network components.

Figure 2A:
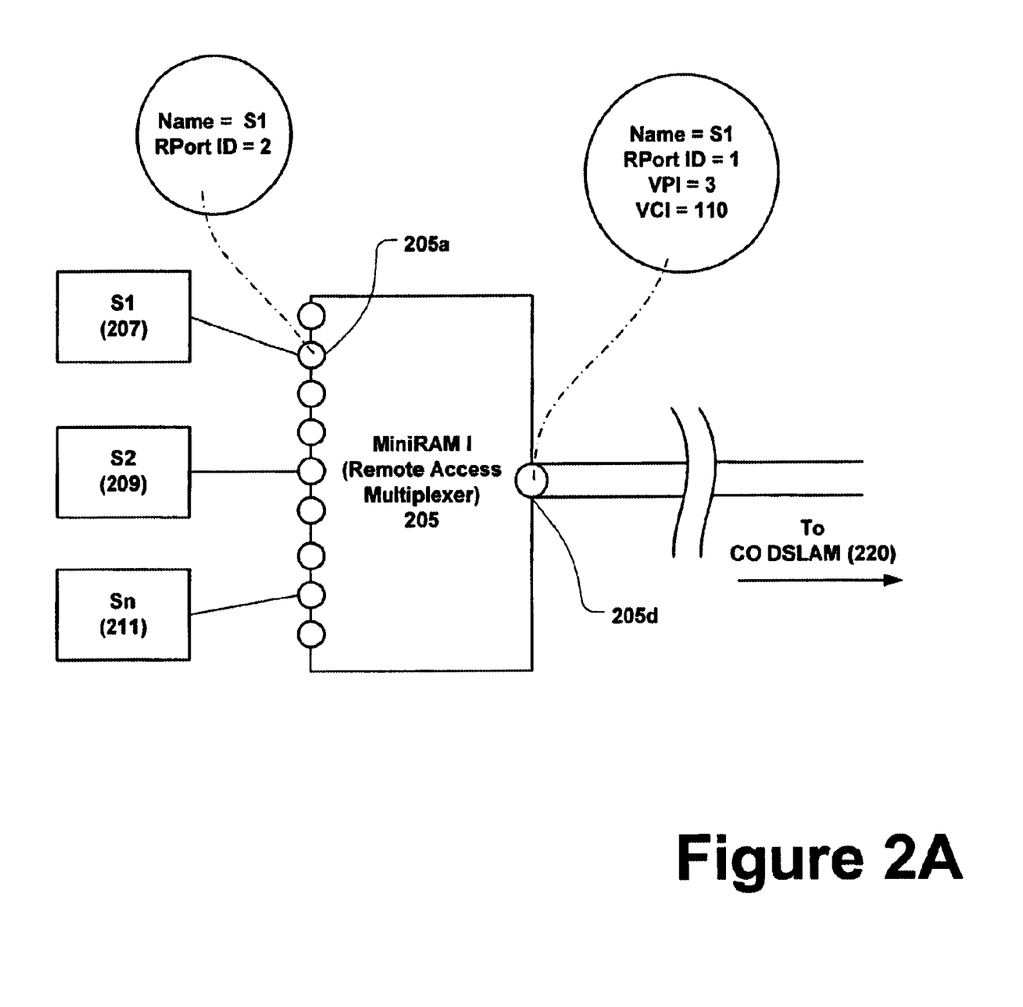
FIG. 2A is a block diagram of exemplary subscribers interacting with an exemplary RAM ADSL network component in accordance with the present invention.
Figure 2B:
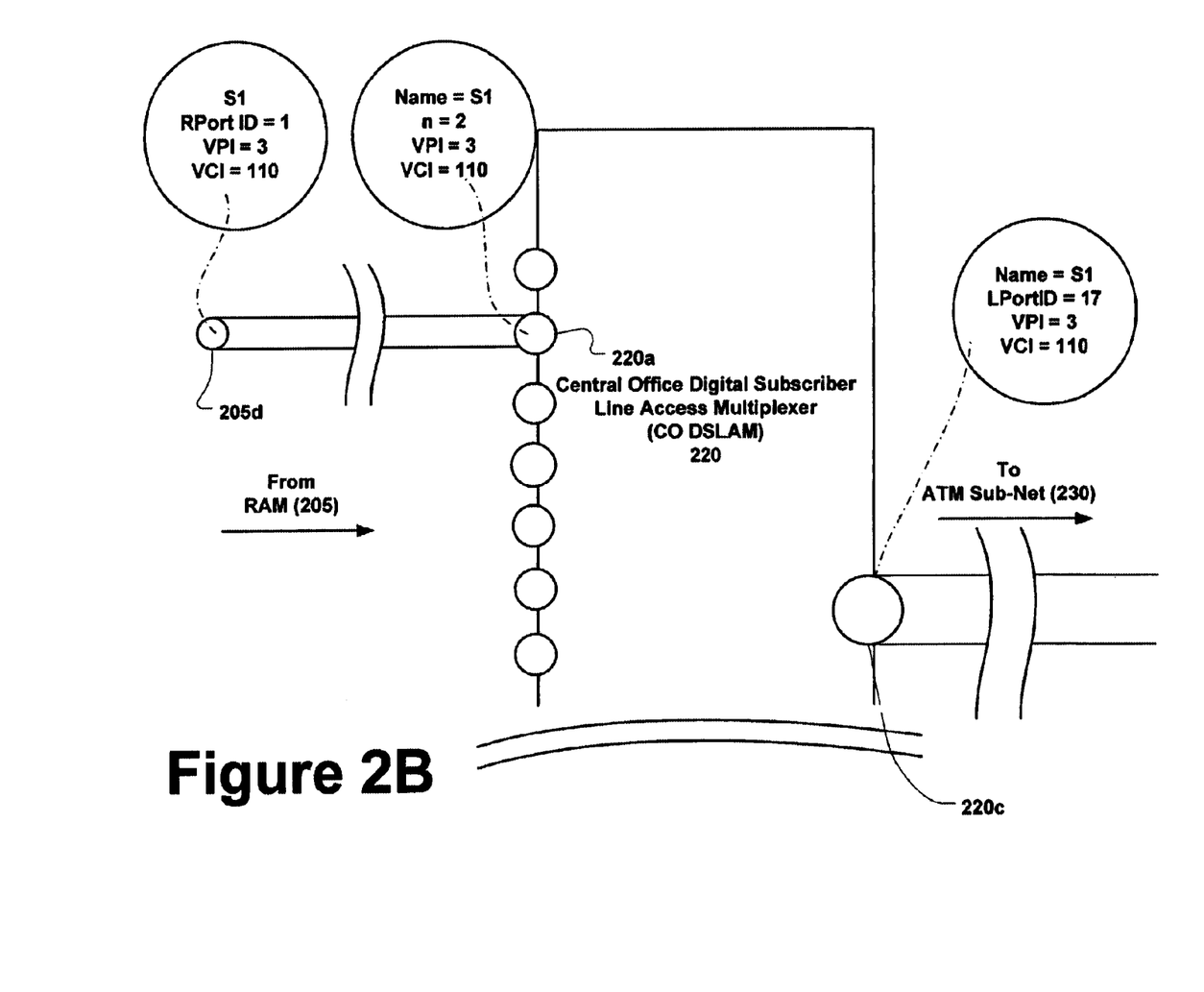
FIG. 2B is a block diagram of an exemplary RAM ADSL network component cooperating with an exemplary CO DSLAM ADSL network component in accordance with the present invention.
Figure 2C:
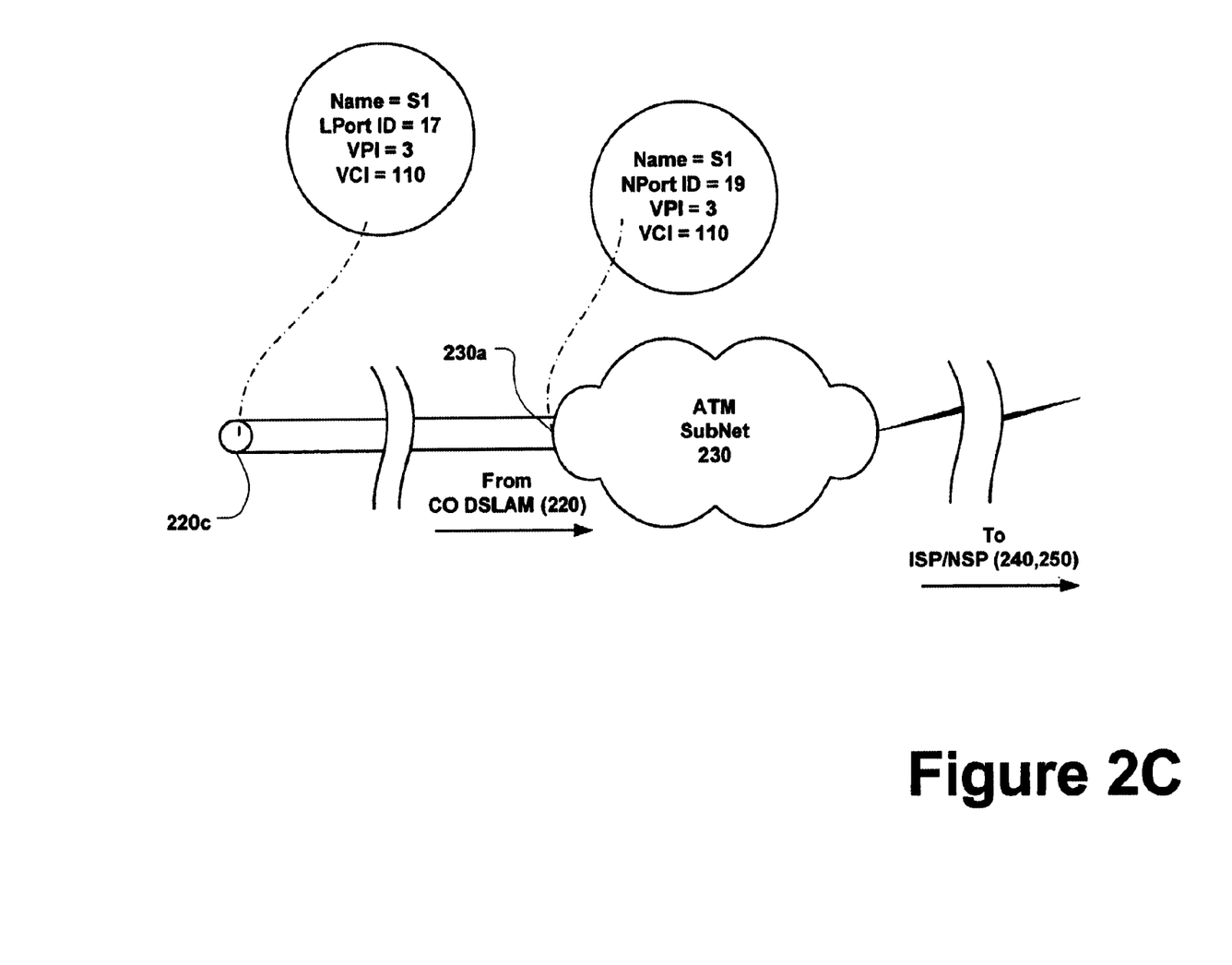
FIG. 2C is a block diagram of an exemplary CO DSLAM ADSL network component cooperating with an exemplary ATM sub-net in accordance with the present invention.

FIGS. 2A–2C illustrate the configuration of the various ADSL network values to create a permanent virtual circuit (PVC) for subscribers on an exemplary ADSL network. FIG. 2A shows the provisioning of resources for subscriber S1 (207) on RAM 205 of exemplary ADSL network 200 (of FIG. 2). In operation, NMS 120 (shown in FIG. 1) communicates with RAM 205 to set RAM configuration and ADSL network configuration variables for S1 (207). As shown, at RAM port 205a, S1 has the RAM input configuration variables Name=S1 and RportID=2. ("RportID" refers to the RAM input port to which a subscriber is assigned.) At the output 205d of RAM 205, S1 has the following values, Name=S1, RportID2=2, VPI=3, and VCI=110. NMS provides RAM 205 the VPI and VCI values for S1. These values may be calculated according to the processing shown in FIG. 3.

FIG. 2B shows the provisioning of resources on CO DSLAM 220 of exemplary ADSL network 200 (of FIG. 2) for subscriber 1. As shown, output 205d of RAM 205 acts as input 220a to CO DSLAM 220. The values of the configuration variables at input 220a of CO DSLAM are as follows: Name=S1, VPI=3, VCI=10, and n=2. The VPI and VCI values are communicated from RAM 205 to CO DSLAM 220 for use in the creation of a PVC for S1. The value represents the sequence number for RAM 205 on CO DSLAM 220. This sequence number indicates the physical connection position of RAM 205 on CO DSLAM 220. In the example shown, n has a value of 2 since RAM 205 occupies the second physical connection position on CO DSLAM 220. Similar to the operation of RAM 205, CO DSLAM contributes additional values in creating the PVC for S1. In the example shown, at output 220a of CO DSLAM 220a, S1 has the values, Name=S1, LPortID=17, VPI=3, and VCI=110. LPortID is the line side (i.e. CO DSLAM side) port value. This value is used in conjunction with the assigned VPI and VCI values to direct data between CO DSLAM 220 and ATM sub-net 230 (not shown).

FIG. 2C illustrates the completion of the PVC for S1 as values are set between CO DSLAM 220 and ATM sub-net 230. In the example shown, at the input of ATM sub-net 230, the PVC for S1 as the following values Name=S1, VPI=3, VCI=110, and NPortID=19. The NPortID value describes the network (i.e. ATM sub-net) port value which is used to transfer data to the ATM sub-net and, subsequently, to cooperating ISPs/NSPs, 240 and 250, respectively (not shown). As such in the example provided, subscriber (S1) is now afforded a connection to cooperating ISPs/NSPs over exemplary ADSL network to transfer data at will. In other words, the combination of values for the VPI (=3), VCI (=110), and NPortID (=19) uniquely identifies the source of the packets as subscriber S1, thereby allowing ATM sub-net 230 to correctly route those packets to the particular ISP/NSP that subscriber S1 uses.

It should be observed that VPI and VCI values are assigned relative to the particular RAM 205 to which S1 is connected, and other RAMs (e.g., RAM 210) could assign VPI and VCI values for their subscribers independently, which would create the possibility of different subscribers having the same VPI and VCI values which, in turn, would mean that the combination of VPI, VCI and NPortID would not uniquely identify a subscriber. However, as discussed below, a feature of the invention is the assignment of VPI and VCI values based on the position of the input port 220a that is used to connect RAM 205 to CO DSLAM 220. Thus, VPI and VCI values can be assigned in such a way that every subscriber connected to CO DSLAM 220 has a unique VPI/VCI combination, regardless of the particular RAM through which such subscriber is connected to CO DSLAM 220.

Figure 3:
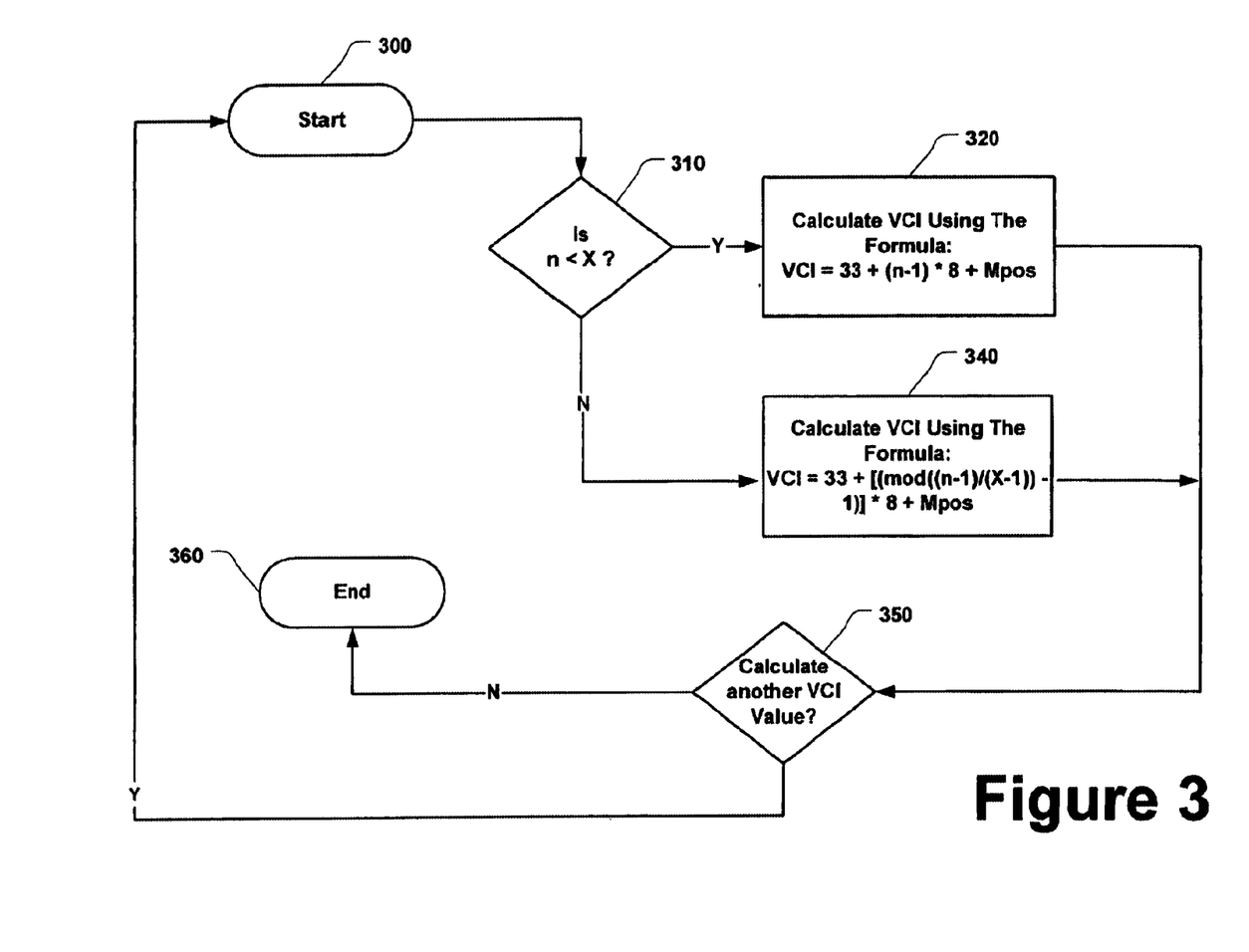
FIG. 3 is flow diagram of the processing performed by the resource planning system to provide deterministic configuration variables in accordance with the present invention.

FIG. 3 shows an exemplary process performed by the NMS 120 of the illustrative ADSL network operations and management system 100 of FIG. 1 to calculate the deterministic configuration variable VCI in accordance with the present invention. Processing begins at block 300 and proceeds to block 310 where a check is performed to determine if the sequence number (n) is less than a pre-defined number X. The pre-defined number X reflects the physical limitations of the cooperating ADSL components. In one example, an ADSL network may comprise a CO DSLAM that is capable of representing VCI values as 10-bit integers (0–1023), and values 0–32 may be reserved for system use. In this case, 991 VCI values (the number of integers between 33 and 1023, inclusive) are available for assignment as VCI values for subscriber PVCs. Moreover, the exemplary ADSL network comprises RAM network components each having eight input ports. Under these parameters, the pre-defined number X is 123 (i.e. 991 subscribers divided by 8). As will be seen below, X represents the condition that the VCI numbers must be recycled after 123 8-port RAMs are connected to the DSLAM, because 8 input ports multiplied by 124 RAMs is greater than 991, and thus there would be insufficient numbers in the range 33–1023 to handle a $124^{th}$ 8-port RAM. If the sequence number is less than the pre-defined number X, processing proceeds to block 320 where the VCI value is calculated using the equation:

$$VCI=33+(n-1)*8+Mpos,$$

where: n=CO DSLAM Sequence Number (i.e. connection position of contributing RAM on CO DSLAM)
Mpos=ADSL Port Position on Contributing RAM
Processing then proceeds to block 350 and therefrom.

It will be observed that block 320 assigns VCI values to each subscriber according to the particular RAM to which the subscriber is connected, and also according to the subscriber's position on that RAM. This algorithm prevents collisions between VCI values for subscribers on different RAMs (up to 123 RAMs), because each RAM has its own run of eight VCI values. For example, a first RAM connected to the CO DSLAM on port sequence number 1 can use VCI values 33–40 (i.e., 33+0*8=33; where Mpos can have values from 0–7, the VCI values for that first RAM can range from 33+0 (=33) through 33+7 (=40)). Similarly, a second RAM connected on CO DSLAM port number 2 can use VCI values 41–48 (i.e., 33+1*8=41; where Mpos can have values from 0–7, the VCI values for that second RAM can range from 41+0 (=41) through 41+7 (=48)).

Returning now to block 310, if it is determined that n is not less than X, processing proceeds to block 340 where the VCI value is calculated using the following formula:

$$VCI=33+[\mathrm{mod}((n-1)/(X-1)]-1*8+Mpos,$$

where: n=CO DSLAM Sequence Number
X=Pre-defined ADSL Network Physical Parameter
Mpos=ADSL Port Position on Contributing RAM.

It will be observed that block 340 implements the "recycling" of VCI values. As noted in the example above, if there are only 991 available VCI values, then it is not possible to assign a unique VCI value to subscribers connected to RAMs in excess of 123 (i.e., for a $124^{th}$ RAM, the calculation would be 33+(124−1)*8+Mpos. 33+(124−1)*8=1017, which means that, according to the formula of block 320, the eight VCI values for a $124^{th}$ RAM would range from 1017 through 1024, and 1024 is an unacceptable value given the physical parameters of the system. Thus, the solution is to use the remainder when (n−1) is divided by (X−1). This essentially causes VCI values to be reused when the number of RAMs exceeds X. When VCI values are recycled, the VPI value must be changed in order to ensure that a unique VPI/VCI combination is assigned to each subscriber. For example, after the $123^{rd}$ RAM, the VPI value could be incremented by one, so that recycling of VCI values does not cause collisions among subscribers in the combined VPI/VCI value.

Following either block 320 or 340, processing then proceeds to block 350 where a check is performed to determine whether another VCI value requires calculation. If there are no more VCI values than require calculation, processing terminates at block 360. However, if the alternative proves to be true, processing reverts to block 300 and proceeds therefrom.

It should be observed that the algorithm described in FIG. 3 yields at least two distinct advantages: First, it deterministically assigns a VPI/VCI value to each subscriber connected to a particular DSLAM (thereby allowing the VPI/VCI value to be recalculated easily for a given subscriber in the case of a "hung" PVC). Second, it prevents two subscribers on the same DSLAM from having the same VPI/VCI value. The algorithm shown in FIG. 3 is a preferred method of accomplishing these goals, but it will be appreciated that other algorithms can be used to meet these goals in the assignment of VPI/VCI values. Such other algorithms may be substituted for that shown in FIG. 3 without departing from the spirit and scope of the invention.

In sum, the present invention provides a system and process to optimize resource planning for ADSL services, allowing ADSL network operators the ability to exploit available resources on an ADSL network. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A system to optimize resource planning for asynchronous digital subscriber line (ADSL) services comprising:

a network management system (NMS) in communication with an ADSL network, wherein said NMS cooperates with said ADSL network using an element management system (EMS), said EMS capable of communicating with ADSL network components using ADSL network component communication protocols and standards; and a computing application, said computing application operating on said NMS capable of allocating, tracking, and managing deterministic resource configuration variables that are used to create permanent virtual circuits (PVCs) on said ADSL network;

wherein said NMS uses said deterministic configuration variables to reanimate hung PVCs; and wherein said NMS cooperates with said EMS to communicate information indicative of said hung PVCs to said ADSL network components such that said ADSL network components can reanimate said hung PVCs, said NMS calculating said deterministic variables using said computing application to ascertain the connection positions of the PVC on said ADSL network components.

2. A method to optimize resources of an ADSL network providing ADSL services, comprising the steps of:

(a) providing a network management system (NMS) capable of calculating, tracking, and storing deterministic configuration variables used in the provisioning of resources on an ADSL network by providing a computing application to operate on said (NMS), said computing application;

creating, managing, and communicating deterministic configuration variables to cooperating ADSL network components for the provisioning of resources; and calculating a virtual circuit identifier (VCI) value, said VCI value being calculated using a plurality of ADSL component configuration data comprising any of connection position information, port information, and sequence position information; and (b) providing a communication means to allow said NMS to communicate with said ADSL network.

3. The method recited in claim 2, wherein the step of calculating said (VCI) value further comprises the step of reverse engineering resource allocations using said VCI value to ascertain the configuration values of said ASDL network components.

4. In an ADSL network comprising a network management system (NMS), an element management system (EMS), at least one remote access multiplexer (RAM), and at least one central office digital subscriber line access multiplexer (CO DSLAM), a method to provision resources on said ADSL network comprising the steps of:

calculating deterministic configuration variables by said NMS by determining RAM and CO DSLAM configuration values for inclusion in providing said deterministic configuration variables; and communicating said calculated deterministic configuration variables to said ADSL network by said NMS using said EMS, said EMS being communicatively coupled to said RAM and CODSLAM.

5. The method recited in claim 4, wherein determining RAM and CO DSLAM configuration values further comprises the steps of communicating with said RAM and said CO DSLAM by said NMS through said EMS to obtain said RAM and CO DSLAM configuration values.

6. In an ADSL network comprising a network management system (NMS), an element management system (EMS), at least one remote access multiplexer (RAM), and at least one central office digital subscriber line access multiplexer (CO DSLAM), a method to provision resources on said ADSL network comprising the steps of:

calculating deterministic configuration variables by said NMS by determining the capacity of said RAM and said CO DSLAM to ascertain the range of values for said deterministic configuration values for communication by said NMS, and choosing a formula associated with said determined capacity for use in calculating said deterministic configuration values; and communicating said calculated deterministic configuration variables to said ADSL network by said NMS using said EMS, said EMS being communicatively coupled to said RAM and CODSLAM.

7. In an ADSL network having a digital subscriber line access multiplexer (DSLAM), a plurality of remote access multiplexers (RAMs) communicatively connected to said DSLAM, and a plurality of subscribers communicatively connected to said DSLAM by way of said plurality of RAMs, wherein each subscriber is identifiable at said DSLAM by a combination of a virtual circuit identifier (VCI) value and a virtual path identifier (VPI) value, a method of assigning VCI values to a subscriber comprising the acts of:

identifying a RAM to which said subscriber is connected;

assigning a sequence number, n, to said RAM, said sequence number being based on a DSLAM input port position to which said RAM is connected;

identifying a port on said RAM to which said subscriber is connected;

assigning a position number, Mpos, to said RAM, said position number being in a range beginning with the number zero, said position number being based on a RAM input port to which said subscriber is connected;

determining the number of ports, P, on said RAM;

computing the value of $P*(n-1)+Mpos$; and assigning a VCI value for said subscriber based on the computed value.

8. The method of claim 7, wherein P is equal to 8, and wherein the range of values for Mpos is zero through seven.

9. The method of claim 8, wherein acceptable VCI values are in the range 33–1023, and wherein said assigning step comprises assigning said subscriber the VCI value according to the formula:

$$33+(n-1)*8+Mpos.$$

10. The method of claim 9, further comprising the step of determining whether n is greater than a pre-defined parameter X.

11. The method of claim 10, wherein the computed value is computed based on mod $((n-1)/(X-1))$ if n is greater than X.

12. The method of claim 11, further comprising the step of assigning a VPI value based on whether n is greater than X.

* * * * *

UNITED STATES PATENT AND TRADEMARK OFFICE
CERTIFICATE OF CORRECTION

PATENT NO. : 6,873,628 B1
DATED : March 29, 2005
INVENTOR(S) : Harry Tang It is certified that error appears in the above-identified patent and that said Letters Patent is hereby corrected as shown below:

Column 8,
Line 34, delete "VCI=10" and insert therefor -- VCI=110 --.

Signed and Sealed this

Thirtieth Day of August, 2005

JON W. DUDAS
*Director of the United States Patent and Trademark Office*